United States Patent
Panje

(10) Patent No.: US 8,442,388 B1
(45) Date of Patent: May 14, 2013

(54) SYSTEM AND METHOD FOR RECORDING VIDEO CONTENT

(75) Inventor: Krishna Prasad Panje, Bangalore (IN)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 13/303,438

(22) Filed: Nov. 23, 2011

(51) Int. Cl.
*H04N 5/78* (2006.01)
*H04N 5/84* (2006.01)
*H04N 5/89* (2006.01)

(52) U.S. Cl.
USPC .......................................... 386/314; 386/332

(58) Field of Classification Search .................. 386/314, 386/323–326, 332–335
See application file for complete search history.

(56) References Cited

U.S. PATENT DOCUMENTS

| | | |
|---|---|---|
| 6,492,997 B1 | 12/2002 | Gerba et al. |
| 2002/0040475 A1 | 4/2002 | Yap et al. |
| 2002/0106185 A1 | 8/2002 | Fujii et al. |
| 2003/0159145 A1 | 8/2003 | Kaltz |
| 2003/0210891 A1 | 11/2003 | Burda |
| 2006/0171658 A1 | 8/2006 | Jochemsen et al. |
| 2007/0122108 A1 | 5/2007 | Bontempi |
| 2008/0107396 A1 * | 5/2008 | Chung et al. .................... 386/85 |
| 2009/0136215 A1 * | 5/2009 | Barton et al. .................. 386/124 |
| 2010/0076646 A1 * | 3/2010 | Basir et al. ...................... 701/35 |
| 2010/0275228 A1 | 10/2010 | Panje |

FOREIGN PATENT DOCUMENTS

| | | |
|---|---|---|
| EP | 1185095 A1 | 3/2002 |
| EP | 1367824 A2 | 12/2003 |

OTHER PUBLICATIONS

PCT Search Report & Written Opinion, Re: Application # PCT/US2012/065405, Jan. 18, 2013.

* cited by examiner

*Primary Examiner* — Thai Tran
*Assistant Examiner* — Nigar Chowdhury
(74) *Attorney, Agent, or Firm* — Lori Anne D. Swanson

(57) ABSTRACT

An aspect of the present invention provides a device for use with a stream of video content and a video display. The device includes a receiver, a circular buffer, an output portion, a controller and a second buffer. The receiver receives the stream of video content. The circular buffer stores up to a predetermined first length of the stream of video content as buffered video content. The output portion outputs a first video signal, based on the buffered video content, to the video display. The controller controls the output portion to output the first video signal as one of the buffered video content playing in real time, a paused portion of the buffered video content, and a previously played portion of the buffered video content. The second buffer stores a portion of the buffered video content as stored video content. The output portion outputs a second video signal, based on the stored video content, to the video display. The circular buffer continues to store the stream of video content when the controller controls the output portion to output the first video signal as one of the paused portion of the buffered video content and the previously played portion of the buffered video content. When the circular buffer stores the stream of video content for a second length that is greater than the first length, the controller can further control the second buffer to store a predetermined portion of the second length as the portion of the buffered video content.

20 Claims, 6 Drawing Sheets

SYSTEM AND METHOD FOR RECORDING VIDEO CONTENT

BACKGROUND

The present invention relates to the field of digital broadcasting, in particular, storage of multimedia content in digital video recorders (DVR) or Set-Top-Boxes (STB).

With the advent of Digital TV/DVR and media delivery systems like IPTV (Internet Protocol Television) and VOD (Video On Demand), consuming media (video/audio) content has become very flexible. Modern STBs provide the users with flexibility to record the video contents and watch it later at their own convenience. A DVR records the digital video content on a storage device, which can store several hours of video content. Some STBs come with multiple tuners, which provide the users flexibility to record or watch multiple programs on multiple windows. STBs or DVRs are examples of CPE (Customer Premises Equipment), and are used interchangeably in this application.

A conventional STB supports Live-Off-Disk (LOD) mode, which allows the users to perform trick plays (pause, rewind, fast forward) on the live television content. Conventional STBs make use of a circular buffer for temporary storage of such LOD content. This is explained further using a conventional STB with the help of FIG. 1.

FIG. 1 illustrates a conventional STB 100.

As illustrated in the figure, conventional STB 100 includes a tuner 102, a processor 104, a memory 106, a controller 108, a receiver 110, a circular buffer 112, an output portion 114 and a display device 116. In this example, tuner 102, processor 104, memory 106, controller 108, receiver 110, circular buffer 112, output portion 114 and display device 116 are distinct elements. However, in some embodiments, at least two of tuner 102, processor 104, memory 106, controller 108, receiver 110, circular buffer 112, output portion 114 and display device 116 may be combined as a unitary element.

Further, in some embodiments, at least one of processor 104, memory 106, controller 108, receiver 110, circular buffer 112 or output portion 114 may be implemented as a non-transient, tangible, computer-readable media for carrying or having computer-executable instructions or data structures stored thereon. Such non-transient, tangible, computer-readable media can be any available media that can be accessed by a general purpose or special purpose computer. Non-limiting examples of non-transient, tangible, computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a non-transient, tangible, computer-readable medium. Thus, any such connection is properly termed a non-transient, tangible, computer-readable medium. Combinations of the above should also be included within the scope of non-transient, tangible, computer-readable media.

Tuner 102 is arranged to receive a data signal 118 and to output a signal 124 to receiver 110. Data signal 118 may be a MPEG1/2/4 Transport Stream (TS) carrying the stream of video content including audio, video and protocol data transmitted by a headend (not shown).

Processor 104 is arranged to bi-directionally communicate with tuner 102 via a signal 120; bi-directionally communicate with memory 106 via a signal 122; and bi-directionally communicate with controller 108 via a signal 126. Memory 106 may include program memory and/or data memory for storage. Memory 106 may also include a hard disk drive.

Controller 108 is arranged to communicate with receiver 110 via a signal 128; communicate with circular buffer 112 via a signal 130; and communicate with output portion 114 via a signal 132. Controller 108 is operable to receive instructions from processor 104 to provide controls to receiver 110, circular buffer 112 and output portion 114 to support trick plays as requested by the user.

Output portion 114 receives the live media content from receiver 110 via a signal 136 and the buffered media content from circular buffer 112 via a signal 138. Controller 108 provides a select signal 132 to output portion 114 for selecting the media data received from receiver 110 or circular buffer 112. Output portion 114 provides the selected media data to display device 116 via a signal 140.

Once tuner 102 is tuned to a channel, processor 104 instructs controller 108 to start receiving the media data in receiver 110. Receiver 110 communicates with circular buffer 112 via a signal 134 for temporary storage of data. Conventional STB 100 supports LOD mode, thus allowing users to pause live media content and be able to rewind the media content for an amount of time as limited by the capacity of circular buffer 112. As the media data is being received by receiver 110, it is also temporarily stored in circular buffer 112 in order to provide trick play features to the user. Circular buffer 112 is a finite length of memory; therefore when circular buffer 112 is full and a subsequent write is performed, the oldest data in circular buffer 112 is overwritten. The functionality of circular buffer 112 is explained in detail with the help of FIG. 2.

FIG. 2 illustrates an example embodiment of circular buffer 112.

As illustrated in FIG. 2, a length 200 of circular buffer 112 is divided in to different blocks of data ranging from 202-228. Block a starting at an address 202 is the oldest data written in circular buffer 112 with a length b and an end address indicated by block 212. Another block m starting at an address 214 with a length n and an end address indicated by block 222 wraps around the boundary of circular buffer 112. Blocks x, y and z are the recent blocks at addresses 224, 226 and 228 respectively, block z being the most recent. In one example, different blocks of data may correspond to different programs stored in LOD mode.

Once tuner 102 is tuned to a channel, media data is stored in circular buffer 112. When the user wishes to view the media data, it is read from circular buffer 112 and displayed on display device 116 via output portion 114. The use of circular buffer 112 allows the user to perform trick plays on the media content, for example, the user; can 'pause' the live media content, which is being displayed through circular buffer 112; can 'rewind' up to certain duration; or can replay the media content. Since circular buffer 112 is of finite length, it only stores a certain amount of data and as the new data comes in, old data keeps getting overwritten in circular manner.

In LOD mode, when the user wishes to 'pause' the viewing, circular buffer 112 continues storing the new data. If the user does not 'resume' soon enough, portions of user desired content, which might have happened during the pause period, can get lost because the data stored in circular buffer 112 gets overwritten by the new data. Referring back to FIG. 2, as an example, if the user was watching a program, which is part of blocks 214-222, the new data will start storing at address 202 and if the user did not 'resume' soon enough, the new data will overwrite the blocks 214-222, resulting in the loss of user desired content. Further, in the case of when the user does not 'resume' from a 'pause' position then after a certain time all the contents of circular buffer 112 are overwritten.

What is needed is a system and method for storing media content, in order to minimize loss of media content during DVR trick plays.

BRIEF SUMMARY

The present invention provides a system and method for storing media content, in order to minimize loss of media content during DVR trick plays.

The present invention provides a device for use with a stream of video content and a video display. The video display can display a video based on the stream of video content. The device includes a receiver, a circular buffer, an output portion, a controller and a second buffer. The receiver is arranged to receive the stream of video content. The circular buffer can store up to a predetermined first length of the stream of video content as buffered video content. The output portion can output a first video signal, based on the buffered video content, to the video display. The controller can control the output portion to output the first video signal as one of the buffered video content playing in real time, a paused portion of the buffered video content, and a previously played portion of the buffered video content. The second buffer can store a portion of the buffered video content as stored video content. The output portion can further output a second video signal, based on the stored video content, to the video display. The circular buffer can further continue to store the stream of video content when the controller controls the output portion to output the first video signal as one of the paused portion of the buffered video content and the previously played portion of the buffered video content. When the circular buffer stores the stream of video content for a second length that is greater than the first length, the controller can further control the second buffer to store a predetermined portion of the second length as the portion of the buffered video content.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

Aspects of the present invention provide a system and method, where in LOD mode, user desired media content is copied from the circular buffer to a second buffer based on metadata such that the media content is not lost when the circular buffer is overwritten. A non-limiting example of metadata includes a keyword.

In one embodiment of the invention, the second buffer is a linear buffer, which stores the designated portions of the circular buffer sequentially, marked by individual keywords. An STB including a second buffer in accordance with an aspect of the invention is explained in detail with the help of FIG. 3.

Figure 1:
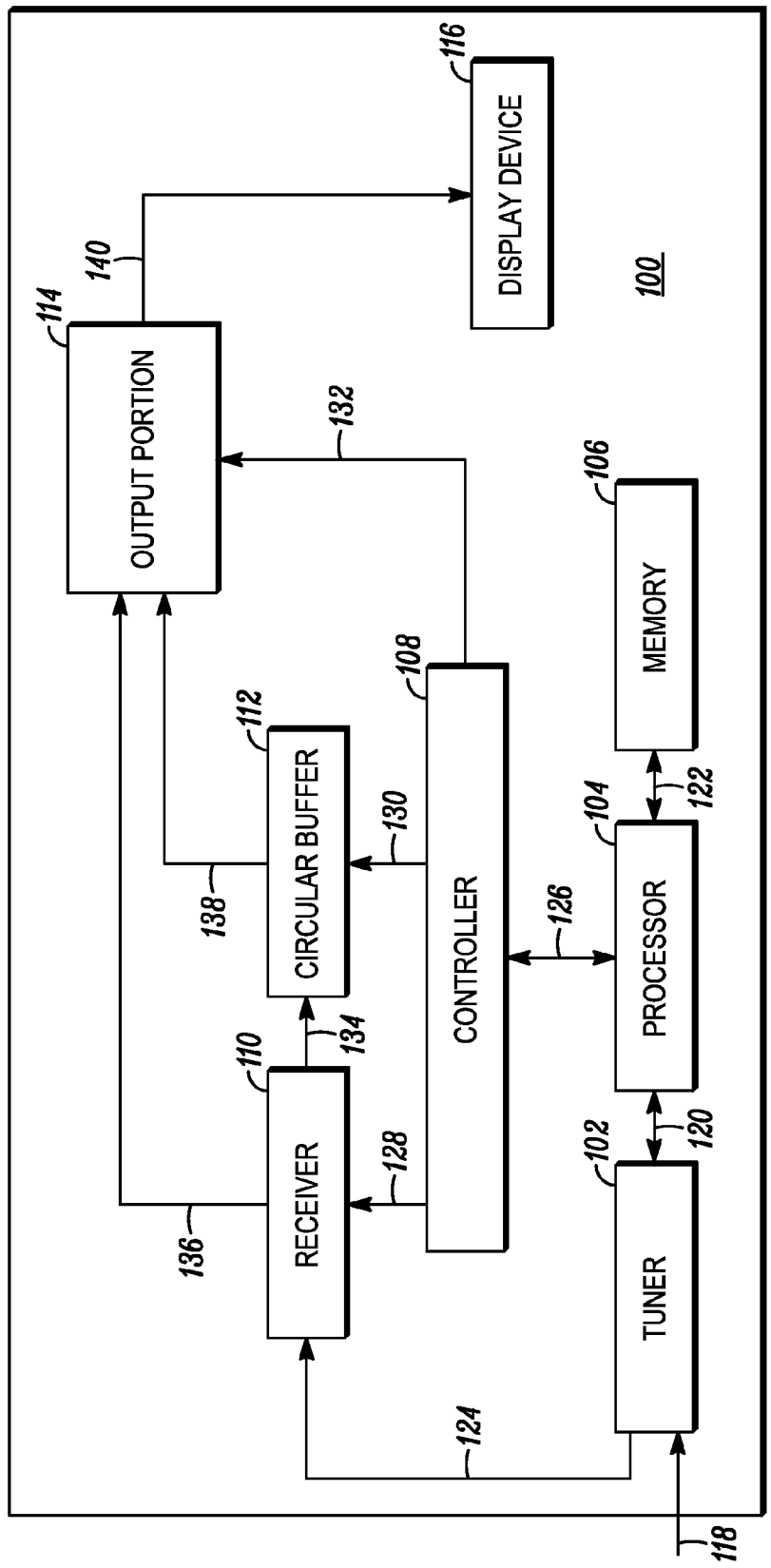
FIG. 1 illustrates a conventional STB.
Figure 2:
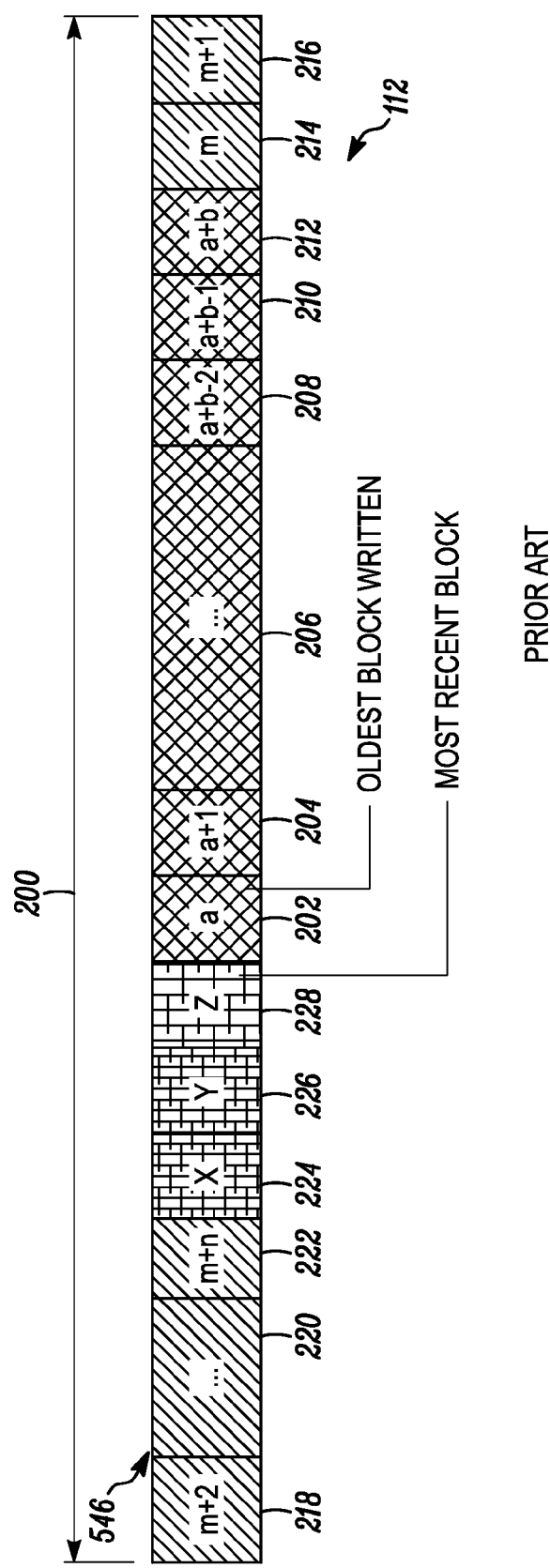
FIG. 2 illustrates an example embodiment of circular buffer.
Figure 3:
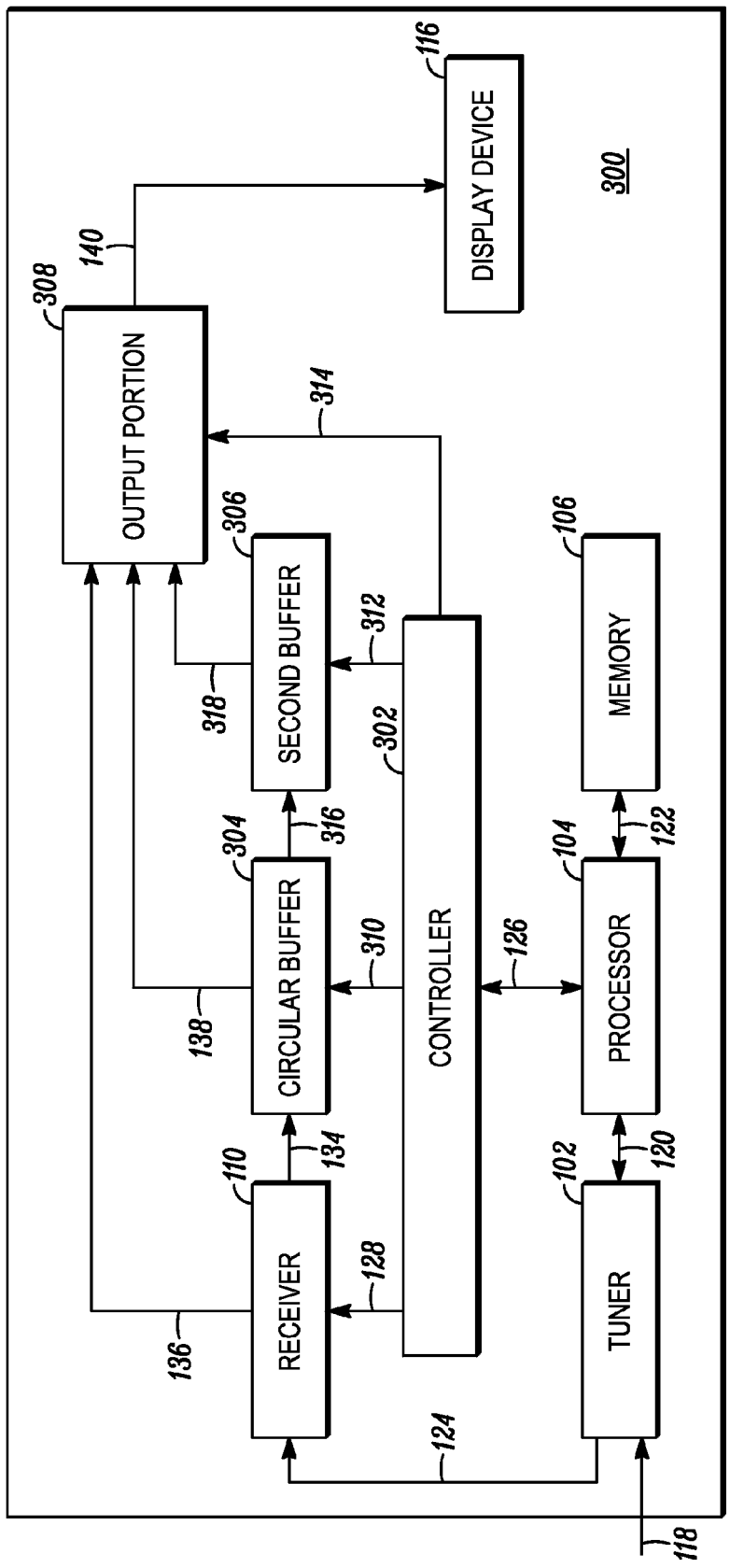
FIG. 3 illustrates an example STB in accordance with an aspect of the invention.

FIG. 3 illustrates an STB 300 in accordance with an aspect of the invention.

As illustrated in the figure, STB 300 includes a controller 302, a circular buffer 304, a second buffer 306, and an output portion 308, in addition to few components of STB 100, namely, tuner 102, processor 104, memory 106, receiver 110 and display device 116. In this example, tuner 102, processor 104, memory 106, controller 302, receiver 110, circular buffer 304, second buffer 306, output portion 308 and display device 116 are distinct elements. However, in some embodiments, at least two of tuner 102, processor 104, memory 106, controller 302, receiver 110, circular buffer 304, second buffer 306, output portion 308 and display device 116 may be combined as a unitary element.

Further, in some embodiments, at least one of tuner 102, processor 104, memory 106, controller 302, receiver 110, circular buffer 304, second buffer 306, output portion 308 and display device 116 may be implemented as a non-transient, tangible, computer-readable media for carrying or having computer-executable instructions or data structures stored thereon. Such non-transient, tangible, computer-readable media can be any available media that can be accessed by a general purpose or special purpose computer.

Controller 302 is arranged to communicate with circular buffer 304 via a signal 310; communicate with second buffer 306 via a signal 312; and communicate with output portion 308 via a signal 314. Circular buffer 304 is arranged to function similar to circular buffer 112 except that it interfaces with second buffer 306 via a signal 316. Second buffer 306 is arranged to communicate with output portion 308 via a signal 318.

In LOD mode, when tuner 102 is tuned to a channel as initiated by the user, media content starts recording on circular buffer 304 followed by reading from circular buffer 304 for displaying on display device 116, as controlled by controller 302. Note that the writing and reading to circular buffer 304 is performed in order to support trick plays on the media content instead of directly displaying the media content as received by receiver 110. In order to avoid losing the media content because of circular buffer 304 getting overwritten during trick play mode, the method, in accordance with aspects of the invention, suggests copying portions of the media content that is stored in circular buffer 304, to second buffer 306 by attaching metadata, such as a keyword, to the user desired portions of the media content stored in circular buffer 304. Different steps of the method are described below in detail.

In one embodiment of the invention, the program guide for television programs is forwarded from STB 300 to user's mobile device or computer for the user to select the desired programs. Controller 302 is operable to generate an interface for the user. Any known type of graphic user interface may be used. The interface enables the user to control the media content, such as for example by playing in real time, pausing buffered portions of the video content, and rewinding and playing previously played portions of the buffered video content. The interface additionally enables the user to specify different keywords for individual programs on his mobile device or computer, which is shared by STB 300 or the content server on the headend (not shown). As an example, for sports program, keywords could be 'goal', 'penalty', 'homerun' or 'touchdown'. For movie programs, some example keywords are "actor name" or "songs".

In another embodiment, the program keyword could be a scene description described using a scene description language. With the use of a scene description language, a media scene can be described using simple text, for example, ASCII (American Standard Code for Information Interchange). Some non-limiting examples of XML (Extensible Markup Language) based scene description languages are 3DMLW and X3D.

In one embodiment, metadata is concatenated to the user desired media content. In one embodiment, the media content is described in MPEG 2/4/7 format such that any of the below mentioned formal schemes may be used to identify and address the media content. For example, MPEG7 provides information about the content by tagging particular events and storing the associated metadata in order to allow fast and efficient searching of material that is of the interest to the user. Multimedia Description Schemes (MDS) are metadata structures, which are used for describing and annotating AV (Audio Visual) content. MDS provide a standardized way of describing the AV content and content management in XML in order to facilitate searching, indexing, filtering and access of multimedia data.

In one embodiment, MPEG4 audio/video objects is described using MPEG Syntax Description Language (MSDL) as metadata for the media content.

In one embodiment, Digital Asset Management (DAM) is employed for indexing, storing, searching and retrieving media content through metadata tags.

In another embodiment, the program keywords are associated with the CC (Closed Captions) or VBI (Vertical Blanking Interval) for a program.

In accordance with aspects of the invention, the keyword or the metadata is fed to the TS multiplexer along with corresponding A/V (Audio/Video), where the process ID (PID) assigned to the keyword/metadata is different than the PIDs assigned to A/V data. Some non-limiting examples of embedding more information in the media content using metadata are VBI, text, CCI and object descriptors. In one embodiment, metadata is multiplexed along with the media content before feeding to the TS multiplexer. This is explained further with the help of FIGS. 4A-4C.

Figure 4A:
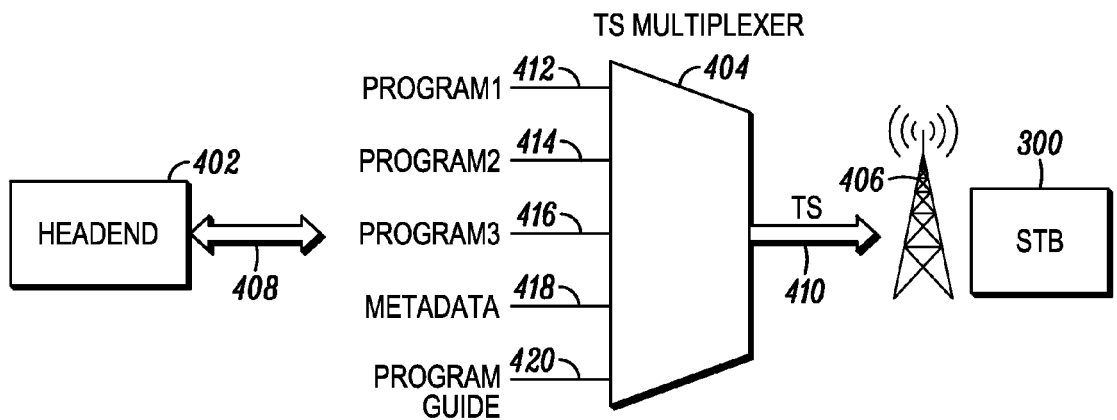
FIGS. 4A-4C illustrate different embodiments of multiplexing the metadata with the media content in accordance with aspects of the invention.
Figure 4B:
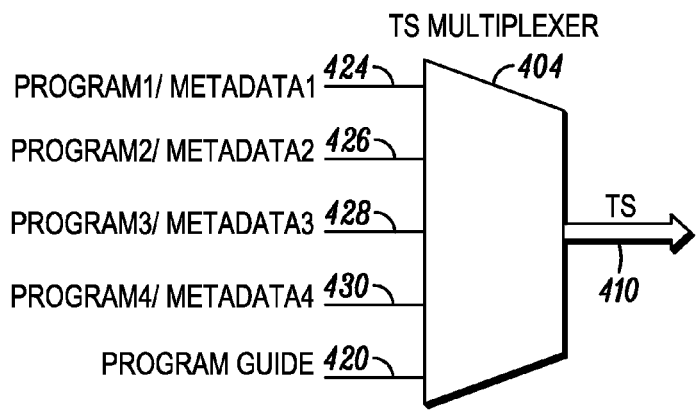
Figure 4C:
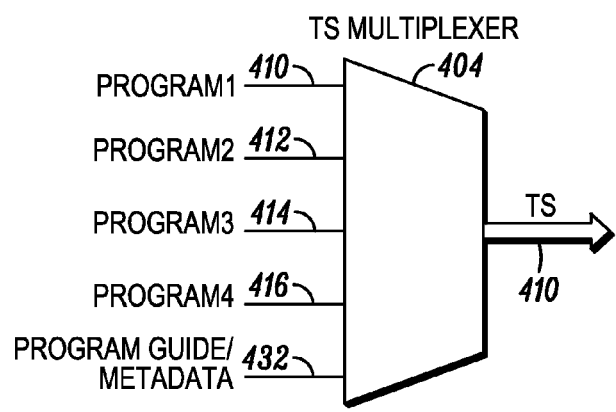

FIGS. 4A-4C illustrate different embodiments of multiplexing the metadata with the media content in accordance with aspects of the invention.

As illustrated in FIG. 4A, a headend 402 provides media content with the program guide to a TS multiplexer 404 via a link 408. For illustration purposes, media content is divided in to program1 on an input 412, program2 on an input 414 and program 3 on an input 416. In this example embodiment, metadata 418 is multiplexed with media content and a program guide 420. A multiplexed TS 410 is broadcasted via a communication link 406 to STB 300.

FIG. 4B illustrates another example embodiment, where the metadata is multiplexed with the media content itself. As illustrated in the figure, a program1 with metadata1 is provided on input 424, a program2 with metadata2 is provided on input 426, a program3 with metadata3 is provided on input 428, and a program4 with metadata4 is provided on input 430.

FIG. 4C illustrates another example embodiment, where the metadata is multiplexed with a program guide 432.

As discussed with reference to FIGS. 4A-4C, metadata or keywords can be multiplexed with the media content or the program guide before feeding to TS multiplexer 404, in accordance with aspects of the invention. The metadata or keywords can be created with any of the schemes discussed earlier.

STB 300 tunes to a program and presents it to the user in LOD mode, i.e., media content is being recorded on circular buffer 304. Controller 302 monitors currently tuned program to search for the keywords provided by the user. For the purposes of discussion, assume that the keywords associated with that program are 'penalty' and 'goal'. If the user decides to 'pause' the program and during the 'pause' period, if an event with the keyword 'penalty' or 'goal' happens then controller 302 marks that portion of circular buffer 304, which has this event. The marked portion of circular buffer 304 is copied to second buffer 306 as instructed by controller 302. This is further explained in detail with the help of FIG. 5.

Figure 5:
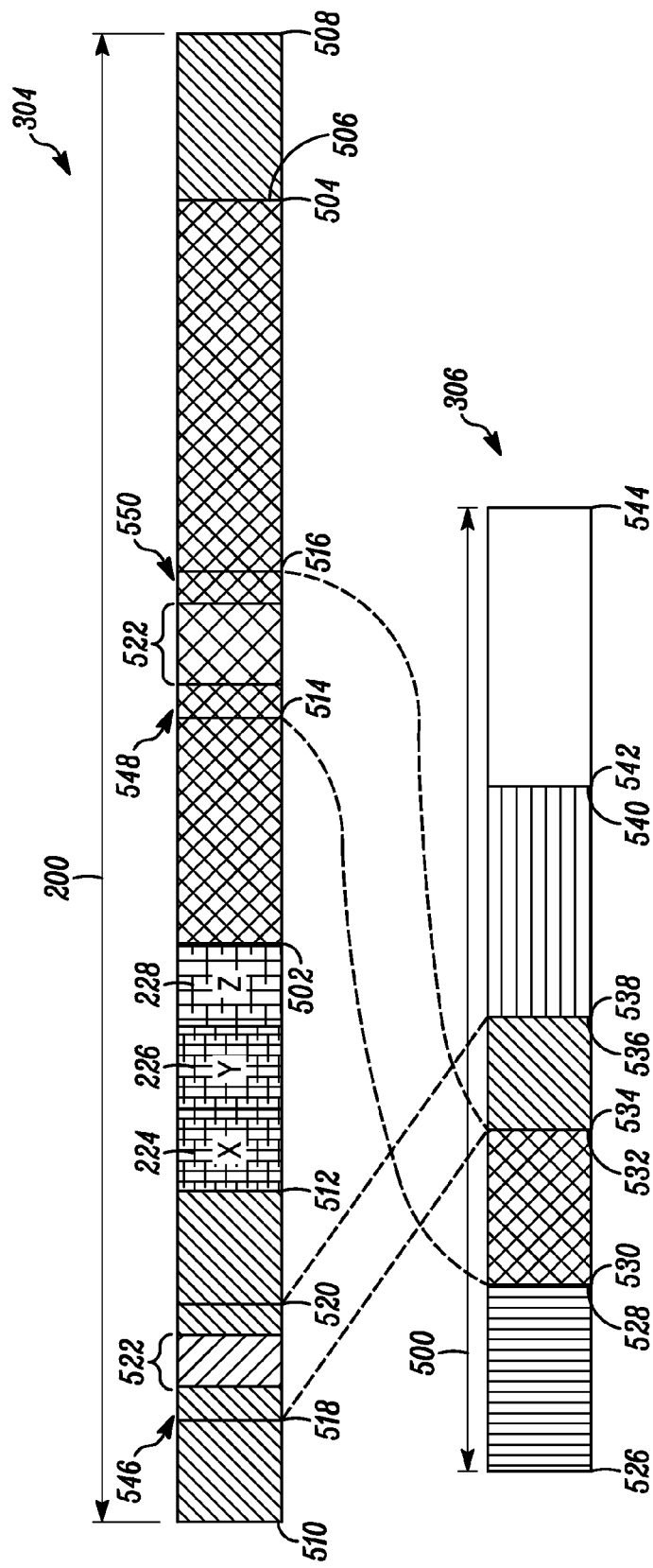
FIG. 5 illustrates an example embodiment of data transfer between a circular buffer and a second buffer in accordance with an aspect of the invention.

FIG. 5 illustrates an example embodiment of data transfer between circular buffer 304 and second buffer 306 in accordance with an aspect of the invention.

As illustrated in the figure, circular buffer 304 is holding media content that is divided in to different blocks. The basic functionality of circular buffer 304 is similar to circular buffer 112. The oldest data written in circular buffer 304 has a start address 502 and an end address 504. The next data block has a start address 506 and an end address 512 with wrap around occurring at boundaries 508 and 510. Blocks 224, 226 and 228 are recent data blocks similar to circular buffer 112.

Second buffer 306 has a length 500 and is also divided in to blocks with start and end addresses ranging from 526-528, 530-532, 534-536, 538-540 and 542-544.

As discussed with additional reference to FIG. 3, first media content, with a predetermined length, starts recording in circular buffer 304 from start address 502. Suppose that the keyword 'goal' occurs at an address 522. Controller 302 designates the keyword position by marking a start address that is few seconds before the keyword and an end address that is few seconds after the keyword. In this example embodiment, controller 302 designates the keyword position by marking a start address 514, which is at a time 548 before keyword 522 and an end address 516, which is at time 550 after keyword 522.

In this example embodiment, controller 302 instructs circular buffer 304 to store a first-in portion of the media content to second buffer 306, wherein the first-in portion of the media content is the oldest content. Controller 302 initiates copying of the first media content between start address 514 and end address 516 of circular buffer 304 to a first location in second buffer 306 marked by a start address 530 and an end address 532. Note that second buffer 306 contains a copy of previous media content between a start address 526 and an end address 528.

Suppose that the first media content ended at address 504 and another program starts recording at address 506 with a keyword 'Pacino' associated with that program. Suppose that the keyword 'Pacino' happened at an address 524. In this example embodiment, controller 302 designates the keyword position by marking a start address 518, which is at a time 546 before keyword 524 and an end address 520, which is at time 546 after keyword 524. Time 546 can be a variable, which is controlled by processor 104.

Controller 302 initiates copying of the second media content between start address 518 and end address 520 of circular buffer 304 to a second location in second buffer 306 marked by a start address 534 and an end address 536. Note that the second location in second buffer 306 is right after the first location, where the first media content was copied, so that the two copies are concatenated. This example embodiment illustrates a copy of a third media content at a start address 538 and an end address 540, which may have been marked by another instance of keyword 'Pacino' in circular buffer 304. Note that second buffer 306 has not been written yet between a start address 542 and an end address 544.

Lets assume that the user did not resume from 'pause' position for time long enough that circular buffer 304 is full. Now any new data that needs to be written in circular buffer 304 has to be stored after the most recent block 228, starting at address 502. If the size of the new data block is bigger than the first media content, that is, it continues after end address 504, the user desired data with associated keywords gets overwritten. However, second buffer 306 holds a copy of portions of the first media data associated with the keywords in accordance with aspects of the invention. For all the events, which happen between the 'pause' position and the 'resume' position are copied to second buffer 306 in concatenation.

When the user 'resumes' from the 'pause' position, there are few options provided by controller 302 for viewing the media content. In one embodiment, the user can watch the live telecast, that is, output portion 308 feeds the media content from receiver 110 to display device 116.

In another embodiment, the user first watches the keyword based media content stored in second buffer 306 before watching the live telecast. In this case, output portion 308 first feeds the stored media content from second buffer 306 before feeding the media content from receiver 110 to display device 116.

In another embodiment, the user resumes from the 'pause' position and continues watching the remaining program. In this case, output portion 308 feeds the media content from circular buffer 304 to display device 116. Note that in this case, some of the user desired contents may have been overwritten in circular buffer 304, even though their copy exists in second buffer 306.

In one embodiment, the user can watch the keyword based media content stored in second buffer 306 on PIP (Picture In Picture) window, while watching the live telecast on main window.

During the 'pause' period, if circular buffer 304 is wrapped few times, portions of all the keyword tagged media content are stored in timely manner on second buffer 306 to provide flexibility to the user for trick plays. Since the copied content on second buffer 306 are stored linearly, the user can perform fast forward (FF) on the contents if desired. At the same time, circular buffer 304 contains latest time shifted data in LOD mode, therefore, providing flexibility to perform trick plays on it.

In case of VOD, the user may desire to 'pause' and resume' in some situations. Aspects of the invention can be used to provide flexibility to watch keyword tagged contents first, before resuming to the live content. In this case, LOD mode may be performed on the storage attached to the network that is providing the VOD.

There may be situations where it is not desired to have the second buffer 306 grow indefinitely. Accordingly, in another embodiment, second buffer the 306 may be pruned. In some example embodiments, the second buffer 306 may be pruned when its limit is reached. For example, the second buffer 306 instructed to only maintaining a first and last event block, or some sampled event blocks between the first and the last event block.

An example method of consuming content in accordance with aspects of the present invention will now be described with additional reference to FIG. 6.

Figure 6:
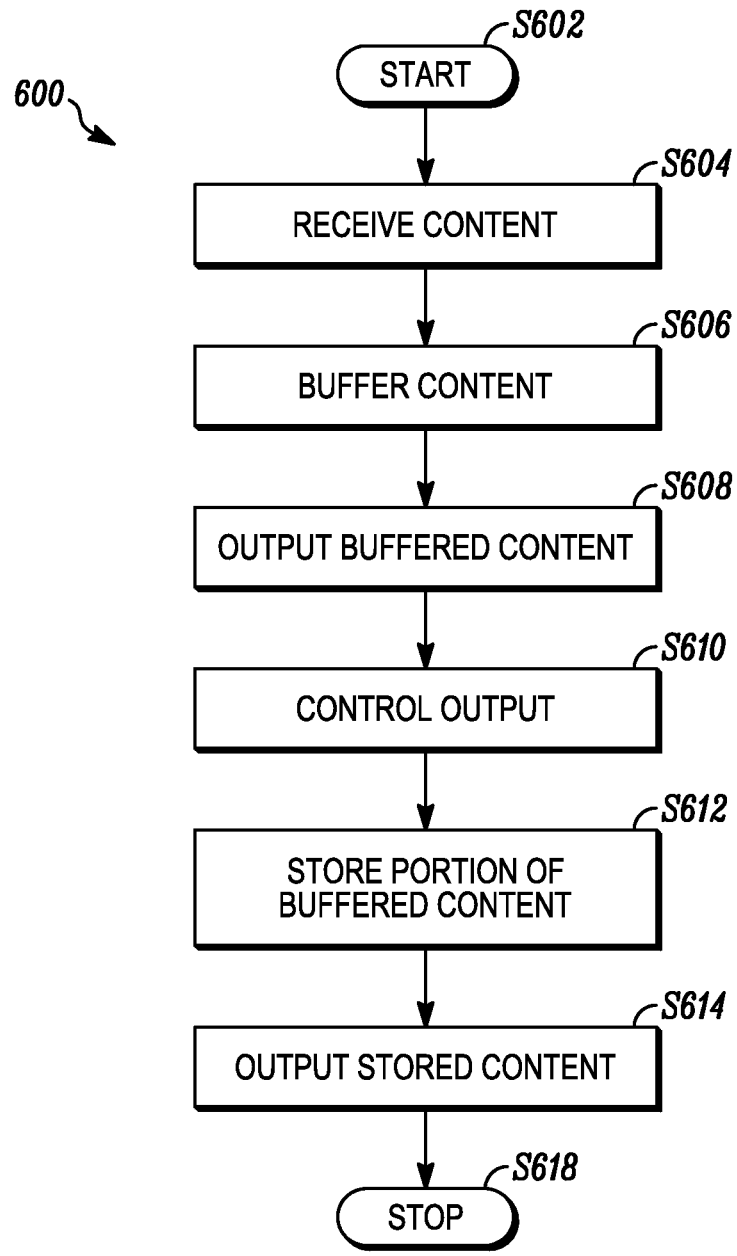
FIG. 6 is a flow chart of an example method of operation of the STB of FIG. 3, in accordance with aspects of the present invention.

FIG. 6 is a flow chart of an example method 600 of operation of STB 300 in accordance with aspects of the present invention.

As shown in FIG. 6, method 600 starts and content is received (S604). For example, returning to FIG. 3, tuner 102 receives data signal 118, which includes content data. The content data may then be processed by receiver 110.

The content is then buffered (S606). For example, receiver 110 may provide the content to circular buffer 112 as signal 134. Up to a predetermined first length of the stream of video content may be stored in circular buffer 112 as buffered video content.

The buffered content is then provided as an output (S608). For example, in one embodiment, receiver 110 may provide the stream of video content to output portion 114 as signal 136 concurrently while providing the stream of video content to circular buffer 112. Output portion 114 then provides the stream of video content to display device 116 as signal 140. In another example embodiment, circular buffer 112 provides the stream of video content to output portion as signal 138. In such an embodiment, signal 140 based on the buffered video content.

The output is then controlled (S610). For example, controller 302 may control output portion, via signal 308, to output signal 140 as one of: the buffered video content playing in real time, a paused portion of the buffered video content, and a previously played portion of the buffered video content.

A portion of the buffered is then stored (S612). For example, in the event that circular buffer 304 becomes full, a portion of the data within circular buffer 304 may be copied to second buffer 306. This will free space in circular buffer 304 for additional storage of the streaming content. The data stored in second buffer 306 may be considered as stored video content.

At this point in time, the stored content may be output (S614). For example, as discussed above, there may be a time when the user would like to rewind to previously stored content. However, the particular content of which the user is attempting to view is no longer in circular buffer 304. Accordingly, second buffer 306 provides the content to output portion 114, which then provides the stream of video content to display device 116 as signal 140.

Method 600 then stops (S618).

As discussed with reference to FIGS. 3-6, aspects of the invention provide a system and method to store portions of the user desired contents of circular buffer 304 in to second buffer 306 such that when circular buffer 304 is overwritten, the user desired contents are available in second buffer 306 for displaying on display device 116.

The user provides certain keywords based on the program guide, which are shared with the STB and the headend. The metadata containing these keywords is multiplexed with the media stream or the program guide before feeding to the TS multiplexer. The controller or processor on the STB retrieves the metadata from the media stream and tags the portions of the circular buffer with the associated keywords. In LOD mode, when the user performs a 'pause', the media content tagged with the keywords are copied to the linear buffer. In this case, even if the circular buffer is overwritten multiple times, the linear buffer holds the copy of keyword tagged media contents. Once the user 'resumes' from the 'pause' position, user desired contents are available in the linear buffer for viewing on the display device as one of the options.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A device for use with a stream of video content and a video display, the video display being operable to display a video based on the stream of video content, said device comprising:
   a receiver arranged to receive the stream of video content;
   a circular buffer operable to store up to a predetermined first length of the stream of video content as buffered video content;
   an output portion operable to output a first video signal, based on the buffered video content, to the video display;
   a controller operable to control said output portion to output the first video signal as one of the buffered video content playing in real time, a paused portion of the buffered video content, and a previously played portion of the buffered video content; and
   a second buffer operable to store a portion of the buffered video content as stored video content,
   wherein said output portion is further operable to output a second video signal, based on the stored video content, to the video display,
   wherein said circular buffer is further operable to continue to store the stream of video content when said controller controls said output portion to output the first video signal as one of the paused portion of the buffered video content and the previously played portion of the buffered video content, and
   wherein when said circular buffer stores the stream of video content for a second length that is greater than the first length, said controller is further operable to control said second buffer to store a predetermined portion of the second length as the portion of the buffered video content.

2. The device of claim 1, wherein when said circular buffer stores the stream of video content for a second length that is greater than the first length, said controller is further operable to control said second buffer to store a first-in portion of the second length as the portion of the buffered video content.

3. The device of claim 2, wherein said controller is operable to generate an interface to enable an interactive choice for said output portion to output the first video signal as one of the buffered video content playing in real time, a paused portion of the buffered video content, and a previously played portion of the buffered video content.

4. The device of claim 3,
   wherein the stream of video content includes concatenated media data, and
   wherein said controller is operable to generate the interface to enable the interactive choice for said output portion to output the first video signal as one of the buffered video content playing a paused portion of the buffered video content and a previously played portion of the buffered video content, based on the concatenated media data.

5. The device of claim 4, wherein said second buffer comprises a linear buffer.

6. The device of claim 1, wherein said controller is operable to generate an interface to enable an interactive choice for said output portion to output the first video signal as one of the buffered video content playing in real time, a paused portion of the buffered video content, and a previously played portion of the buffered video content.

7. The device of claim 6,
   wherein the stream of video content includes concatenated media data, and
   wherein said controller is operable to generate the interface to enable the interactive choice for said output portion to output the first video signal as one of the buffered video content playing a paused portion of the buffered video content and a previously played portion of the buffered video content, based on the concatenated media data.

8. The device of claim 7, wherein said second buffer comprises a linear buffer.

9. The device of claim 1, wherein said second buffer comprises a linear buffer.

10. The device of claim 1, wherein said controller is further operable to control said second buffer to store the predetermined portion of the second length as the portion of the buffered video content based on metadata within the stored video content.

11. A method of displaying a stream of video content on a video display, the video display being operable to display a video based on the stream of video content, said method comprising:
    receiving, via a receiver, the stream of video content;
    storing, via a circular buffer, up to a predetermined first length of the stream of video content as buffered video content;
    outputting to the video display, via an output portion, a first video signal based on the buffered video content;
    controlling, via a controller, the output portion to output the first video signal as one of the buffered video content playing in real time, a paused portion of the buffered video content, and a previously played portion of the buffered video content;
    storing, via a second buffer, a portion of the buffered video content as stored video content;
    outputting to the video display, via the output portion, a second video signal based on the stored video content;
    continuing to store, via the circular buffer, the stream of video content when the controller controls the output portion to output the first video signal as one of the paused portion of the buffered video content and the previously played portion of the buffered video content; and
    controlling, via the controller, the second buffer to store a predetermined portion of the second length as the portion of the buffered video content when the circular buffer stores the stream of video content for a second length that is greater than the first length.

12. The method of claim 11, wherein said controlling, via the controller, the second buffer to store a predetermined portion of the second length as the portion of the buffered video content when the circular buffer stores the stream of video content for a second length that is greater than the first length comprises controlling, via the controller, the second buffer to store a first-in portion of the second length as the portion of the buffered video content.

13. The method of claim 12, further comprising generating, via the controller, an interface to enable an interactive choice for the output portion to output the first video signal as one of the buffered video content playing in real time, a paused portion of the buffered video content, and a previously played portion of the buffered video content.

14. The method of claim 13,
wherein the stream of video content includes concatenated media data, and
wherein said generating, via the controller, an interface to enable an interactive choice for the output portion to output the first video signal as one of the buffered video content playing in real time, a paused portion of the buffered video content, and a previously played portion of the buffered video content comprises generating the interface to enable the interactive choice for the output portion to output the first video signal as one of the buffered video content playing a paused portion of the buffered video content and a previously played portion of the buffered video content, based on the concatenated media data.

15. The method of claim 14, wherein said storing, via a second buffer, a portion of the buffered video content as stored video content comprises storing, via a linear buffer.

16. The method of claim 11, further comprising generating, via the controller, an interface to enable an interactive choice for the output portion to output the first video signal as one of the buffered video content playing in real time, a paused portion of the buffered video content, and a previously played portion of the buffered video content.

17. The method of claim 16,
wherein the stream of video content includes concatenated media data, and
wherein said generating, via the controller, an interface to enable an interactive choice for the output portion to output the first video signal as one of the buffered video content playing in real time, a paused portion of the buffered video content, and a previously played portion of the buffered video content comprises generating the interface to enable the interactive choice for the output portion to output the first video signal as one of the buffered video content playing a paused portion of the buffered video content and a previously played portion of the buffered video content, based on the concatenated media data.

18. The method of claim 17, wherein said storing, via a second buffer, a portion of the buffered video content as stored video content comprises storing, via a linear buffer.

19. The method of claim 11, wherein said storing, via a second buffer, a portion of the buffered video content as stored video content comprises storing, via a linear buffer.

20. The method of claim 11, wherein said controlling, via the controller, the second buffer to store a predetermined portion of the second length as the portion of the buffered video content when the circular buffer stores the stream of video content for a second length that is greater than the first length comprises controlling the second buffer to store the predetermined portion of the second length as the portion of the buffered video content based on metadata within the stored video content.

* * * * *